UNITED STATES PATENT OFFICE.

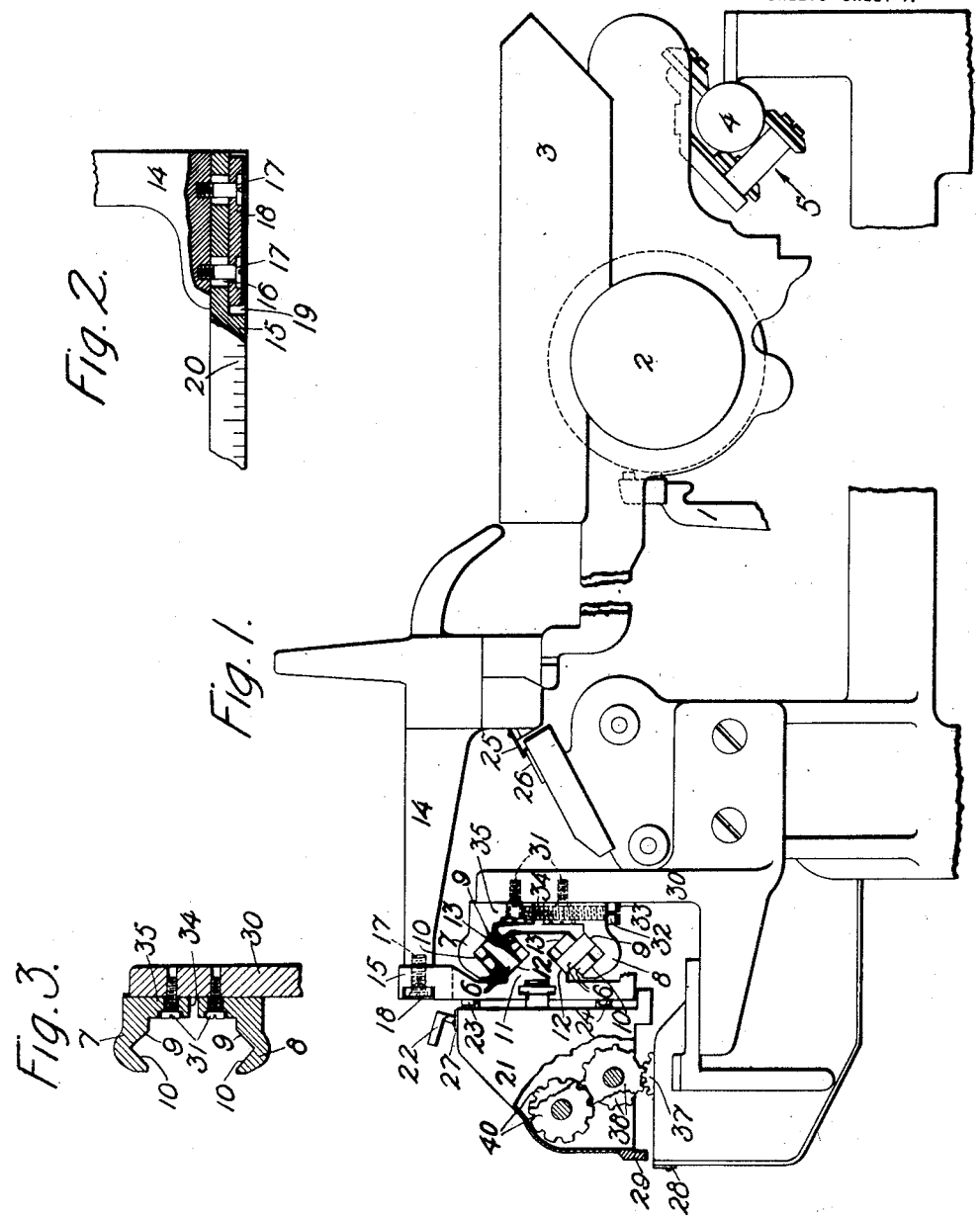
F. A. HART.
COMBINED TYPEWRITING AND COMPUTING MACHINE.
APPLICATION FILED FEB. 5, 1917.
1,356,525.
Patented Oct. 26, 1920.
2 SHEETS—SHEET 1.
Witnesses:
Inventor:
Frederick A Hart
by O.C. Stickney
Attorney.

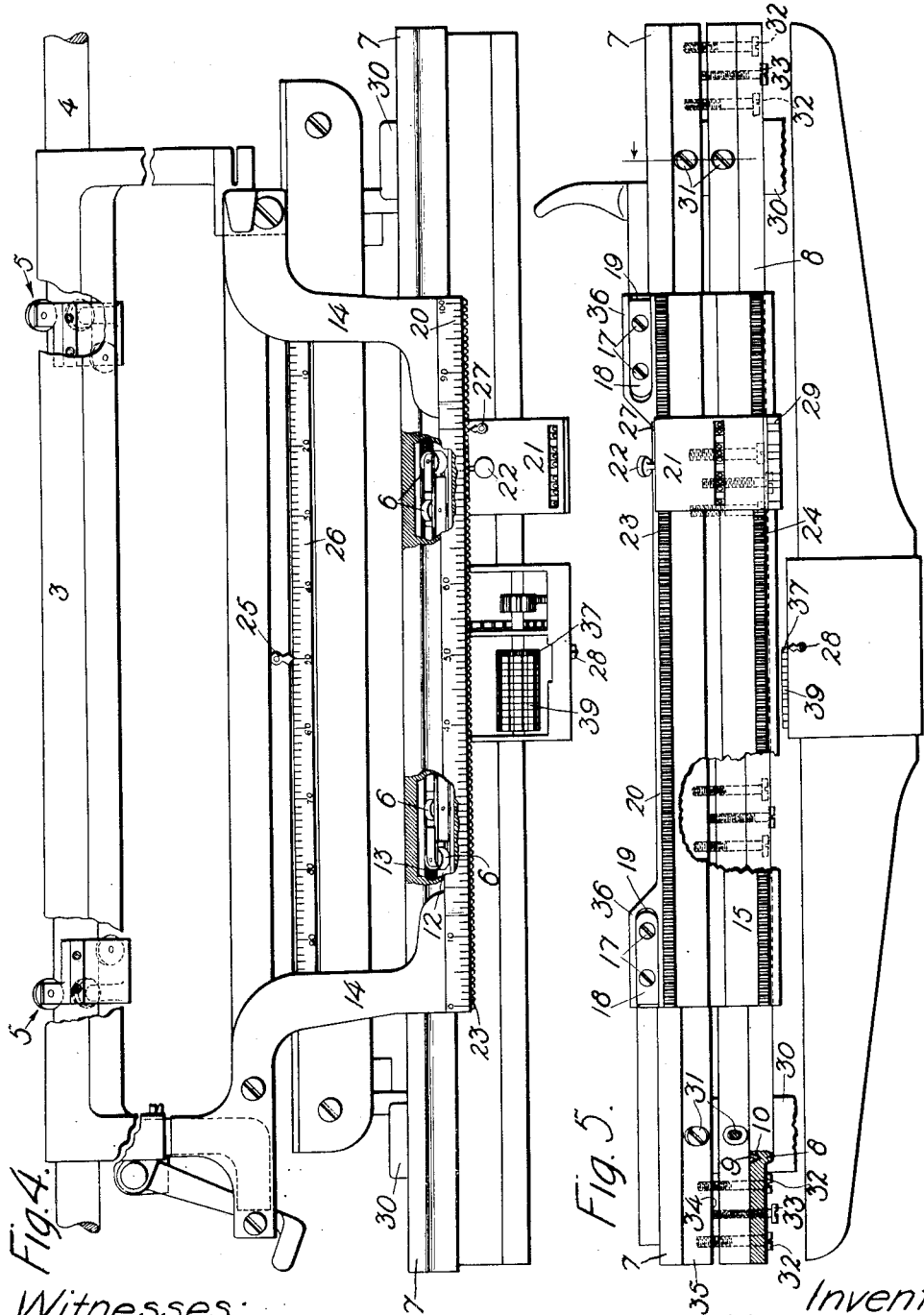

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,356,525.          Specification of Letters Patent.       Patented Oct. 26, 1920.

Application filed February 5, 1917. Serial No. 146,563.

*To all whom it may concern:*

Be it known that I, FREDERICK A. HART, a citizen of the United States, residing in Newark, in the county of Essex and State of New Jersey, have invented certain new and useful Improvements in Combined Typewriting and Computing Machines, of which the following is a specification.

My invention relates to combined typewriting and computing machines and is herein disclosed as applied to such machines in what is known as the Underwood Addendagraph type. In said machines, as in several other kinds of combined typewriting and computing machines, the usual typewriter carriage with its revolving platen is employed, the platen being to the rear of the center of the machine, while the totalizer and many parts of the computing mechanism are at the front of the machine, and both form part of a carriage which travels on rails, there being one rail at the rear of the machine and frequently another rail or rails between the platen and the totalizer.

Since this construction brings the totalizer in front of and outside the rails on which the carriage travels, it is exceedingly important that the adjustment of the rail shall be accurate and that the lost motion between the rails and the bearings which slide on them be negligible. The need for this is especially apparent when it is realized that the totalizers in such machines include a series of computing wheels which have to be turned to a very accurate amount by a master wheel which engages them *seriatim*. This requires that there be little lost motion between the teeth of the master wheel and the computing wheels if the machine is to operate accurately. This elimination of lost motion emphasizes the necessity for accurate adjustment of the carriage rails and the bearings which slide on them; and in fact the carriage should fit the rails so accurately that the totalizer seems rigidly mounted except for the fact that it slides.

It is also desirable to have the totalizers adjustable on said carriage and to provide a scale whereby the totalizer may be readily adjusted and accurately positioned by the average typist. This scale, to be of the most utility, should correspond accurately with the scale by which letter spaces on the typewriter carriage are read off.

To obtain the adjustments indicated above, I have found it advantageous to make the front rail of the carriage double, in the form of two facing V rails, and, since it is impossible to cut two faces perfectly true with reference to each other in such a rail, I make the rail in two separate parts which individually are positively adjustable relatively to each other at several points along their length, thus enabling the slightest irregularity to be taken up. I have also found it advantageous to make the bearings, which slide on the front rails, in the form of roller bearings, one set of rollers near each end of the carriage. I also find it advantageous to provide that the whole front of the carriage including said bearings and the support for the totalizer, may be adjustable relatively to the rest of the carriage, so as to permit the totalizer scale to be set accurately relatively to the escapement mechanism and the rest of the carriage adjustments.

Other features and advantages will hereinafter appear.

In the accompanying drawings,—

Figure 1 is a side view of so much of an Underwood Addendagraph as seems advantageous for illustrating my invention as applied thereto, part of the totalizer being shown in section.

Fig. 2 is a plan view partly sectional showing the devices for adjusting the front of the carriage.

Fig. 3 is a sectional side view showing the adjustable mountings of the rails.

Fig. 4 is a plan view of most of the carriage, the totalizer, etc.

Fig. 5 is a front view of most of the parts seen in Fig. 3.

In the Underwood Addendagraph, alphabet and numeral keys 1 print against the front side of the platen 2, which is revolubly mounted in the carriage 3, said carriage being drawn along a step at a time at the actuation of each numeral key by the operation of the usual Underwood escapement mechanism and spring barrel, not shown herein. The rear of the carriage is positively held to the usual rail 4 by means of a set of three rolls 5 at each end of the carriage. These run on said rail and are themselves journaled on the carriage. The carriage is supported in front by a set of roller bearings adjacent each end of the carriage, each having two sets of rollers, each set including a pair of rollers 6, which have their axes at right angles to each other, There are two rails 7 and 8, on which the front of the carriage runs, and against which said rollers bear, each rail comprising a slanting face 9, which faces forwardly, and a slanting face 10, which faces rearwardly, the two faces being at right angles to each other, so that one roller 6 of every pair, bears either against a face 9 or a face 10, while the carriage itself includes a bar 11 having faces 12 and 13, which respectively are directly opposed to the faces 9 and 10, and themselves form the surfaces on which the rollers 6 run. Thus, the bar 11 includes two oppositely facing V shaped grooves having their apexes adjacent each other, while the two sets of surfaces 9 and 10 respectively, form V-shaped grooves with their openings facing each other.

The bar 11 is fast to the carriage 3 by the usual brackets 14 of the Addendagraph, which rise at opposite ends of the typewriter carriage 3 and extend forwardly over the rails 7 and 8. The bar 11 is a rearwardly projecting part of a front plate 15, said plate being pendent from the front ends of the brackets 14 and adjustable along the face of the brackets. To effect this adjustment, the plate 15 is provided with elongated slots 16, through which pass screws 17, which are threaded into the brackets 14, and of which the heads enter counter-bored holes in holding plates 18, of which one lies in each recess 19 in the end of the front of the front plate 15.

The plate 15 is provided on its upper surface with a scale 20 for the purpose of enabling the typist to accurately and quickly place thereon a totalizer 21, which may be adjustably fastened by means of a handle 22 at any point along the rack 23, which has teeth at letter space intervals. The exact holding means for the totalizer is immaterial to the present invention, but, advantageously, the totalizer engages identical rack bars 23 and 24 at the bottom and top of the plate 15. The typewriter carriage 3 is provided with the usual pointer 25 which indicates on the usual fixed scale 26, the point at which the typewriter carriage stands. Owing to the fact that the scale 20 is a traveling scale, while the scale 26 is a fixed scale, the scales are numbered in opposite directions, with the result that the typist can at once position the totalizer 21 by merely noting the number on the scale 20 at the point on the scale 26 indicated by the position of the pointer 25.

The totalizer 21 has its pointer 27 at one side thereof, namely, opposite the wheel of lowest denomination, since it is usually advantageous to position the totalizer and identify columns by the units figure thereon. For convenience, a pointer 28 is placed on the frame to indicate on the scale 29 formed as an extension at the front and bottom of the totalizer. This pointer indicates where the totalizer stands. The scale 29 shows the comma or pointing off places as blanks. Since the rails 7 and 8 are quite long and must have their faces adjusted with extreme accuracy for the reasons indicated above, it is difficult to manufacture said rails with sufficient accuracy if made in one piece so that they can stand any considerable amount of wear, for resistance to wear necessitates an extremely hard surface which will either wear a cutting tool in cutting it, or else the rail will be warped in being hardened. It is, however, comparatively easy to manufacture a single V-shaped surface which shall be perfectly true. I, therefore, provide means whereby the rails 7 and 8 may be adjusted both separately and relatively to each other, and have found it advantageous to provide for such adjustments at a number of points in the run of the typewriter carriage; four points, for example, in an ordinary ten inch machine is usually sufficient.

To obtain such adjustment the rails 7 and 8 are independently held to an upper front plate 30 fast to the frame of the typewriter, said plate having a flat face, and the rails 7 and 8 being held against said face by flat head screws 31, which are threaded into the plate 30. These screws may fit the rails 7 and 8 fairly closely, as such a term is used in ordinary machine practice; that is, they allow an almost microscopic shifting of the rails on them (see Fig. 5), when they are slightly loosened. For positively adjusting said rails relatively to each other, there is provided a pair of screws 32 which are threaded into the upper rail 7, and have heads which are adapted to draw the lower rail toward the upper rail. In order to keep the rails apart, there is also provided a spacing screw 33, which is threaded in the lower rail 8 and which bears against the horizontal flat surface 34, forming the bottom of the body 35 and the rail 7. It will be seen then that by tightening the screw 33 to the proper tension, the rails 7 and 8 may be properly spaced from each other, and then may be located on the carriage, and then tightened in place by tightening the screws 32, or vice versa. As shown in Fig. 5, there is a group of screws 32, 33, near each end of the rails 7 and 8, and also two groups of said screws spaced at equal intervals between the ends of the rail.

As will be seen from Figs. 4 and 5, the scale 20 is cut directly on the upper surface of the front plate 15, and extends up over the bosses 36 at the end of said plate, these being the bosses which afford room for the cutting of the slot or recess 19.

The master wheel 37 turns in a fixed plane in line with the pointer 28 and is adapted to turn the computing wheel 38 with which it engages. The computing wheels for this purpose project below the totalizer 21, so that they also coöperate with the carry-over devices 39, while they mesh with the numeral wheels 40. It will be observed that by accurately alining the typewriter carriage on its rails, the computing wheels may be very accurately adjusted relatively to the master wheel.

It will thus be seen that the adjustability of the rails 7 and 8 relatively to each other, and to the frame on which they are mounted, enables a very accurate adjustment of the computing wheels to and from the master wheel. Furthermore, the arrangement of the groups of screws at intervals enables the track or groove formed by the rails 7 and 8 to be so accurately alined that the computing wheel shaft moves strictly parallel to the master wheel shaft. This is an important feature, especially where the computing wheels coöperate with a series of carry-over devices, which devices are also mounted on the master wheel shaft.

Variations may be resorted to within the scope of the invention and portions of the improvements may be used without others.

Having thus described my invention, I claim:

1. In a combined typewriting and computing machine, the combination with a totalizer, of a traveling carriage comprising a totalizer support having oppositely facing V-grooves, means for supporting said totalizer support, including two members having V-grooves facing the V-grooves in said totalizer support and forming raceways therewith, bearing devices in said raceways, means at the ends of said members for supporting said ends in fixed position, and means intermediate said ends, whereby intermediate portions of said members may be drawn together or forced apart to properly position portions of said members, to insure accurate guiding of said totalizer in passing through a computing zone.

2. In a combined typewriting and computing machine, the combination with a traveling carriage including a front plate having upper and lower V-shaped grooves, substantially in the same vertical plane, of a totalizer mounted on said front plate, two members provided with V-shaped grooves facing the grooves of said front plate and forming raceways therewith, bearing devices in said raceways, a totalizer on said front plate, a master wheel positioned substantially vertically beneath said totalizer, means to adjust said members comprising means to move them toward and away from each other, and means to secure each of said members in adjusted position.

3. In a combined typewriting and computing machine, the combination with a traveling carriage including a platen and a rail on which said carriage travels near the rear thereof, of a rail toward the front of the machine, a front plate fixed to said typewriter carriage and extending in front of said front rail, a totalizer including a series of wheels, said totalizer supported by said front plate, a master wheel for engagement with said totalizer, bearings between said front plate and said front rail, said front rail comprising two separately-mounted members having bearing surfaces, and means for effecting movement of said members to and from each other and thereby finely adjusting said bearing surfaces relatively to each other to enable accurate meshing of the totalizer wheels and master wheel throughout the computing zone.

4. In a combined typewriting and computing machine, the combination with a traveling carriage comprising a platen, and a rail on which said carriage travels near the rear thereof, of a rail toward the front of the machine, a front plate extending downwardly in front of said front rail, bearings between said front plate and said front rail, and forming the sole support for the front of said carriage, said front rail comprising two separately-mounted bearing surfaces, means for finely adjusting said bearing surfaces relatively to each other, brackets by which said front plate is connected to the typewriter carriage and by which it supports said carriage, means for finely adjusting said plate on said brackets, a scale forming part of said front plate and adjustable therewith, a master wheel in front of said plate, and a totalizer settable on said front plate according to said scale to coöperate with said master wheel.

5. In a combined typewriting and computing machine, the combination with a totalizer, of a traveling carriage comprising a front plate adapted to support said totalizer, and having oppositely facing V-grooves, a track comprising members having V-grooves facing the V-grooves in said plate and forming raceways therewith, bearing devices in said raceways, means for adjusting the ends of said members with respect to each other, means for fixedly securing said ends after such adjustment, and means including a plurality of screws at intermediate points to force said members apart or to draw them together, so that said members may be so adjusted as to insure accurate guiding of said totalizer in passing through a computing zone.

6. In a combined typewriting and computing machine, in combination, a totalizer, a master wheel, a typewriter carriage comprising a totalizer-supporting plate through which said carriage is supported at its front, means, including a track, to guide said plate, said track comprising two rails, and means whereby said rails may be drawn together or forced apart at a plurality of points therealong and flexed if desired, whereby accurate guiding of said totalizer in passing through a computing zone may be effected.

7. In a combined typewriting and computing machine, the combination with a traveling carriage, and a rail on which it travels, of a second rail, a totalizer mounted near said second rail but outside of both rails, a master wheel also outside of said rails, two facing V-grooves formed in said second rail, a plate having V-grooves facing said second rail and forming a mounting for the totalizer, means for adjusting the rail grooves relatively to each other, said means including a separate plate forming the rail for each groove, a plurality of screws for drawing said plates together, and a plurality of screws for forcing said plates apart, said screws forming a plurality of groups, each comprising a separating screw and a drawing-together screw.

8. In a combined typewriting and computing machine, the combination with a traveling carriage, and a rail on which it travels, of a second rail, a totalizer mounted near said second rail but outside of both rails, a master wheel also outside of said rails, two facing V-grooves formed in said second rail, a plate having V-grooves facing said second rail and forming a mounting for the totalizer, means for adjusting the rail grooves relatively to each other, said means including a separate plate forming the rail for each groove, a plurality of screws for drawing said plates together, and a plurality of screws for forcing said plates apart, said screws forming a plurality of groups, each comprising at least a separating screw and a drawing-together screw, the screws in each group being so distributed that they effect a symmetrical straining of the portions.

9. In a combined typewriting and computing machine including a carriage, the combination with a scale showing the position of the carriage, of a totalizer, including dial wheels and a master wheel, a scale for locating the totalizer on the carriage in accordance with the carriage scale, and a scale for indicating the totalizer wheel on which the master wheel is effective.

10. In a combined typewriting and computing machine, the combination with a carriage, of a scale for positioning said carriage, an adjustable totalizer-carrier forming part of said carriage, a scale thereon, and a totalizer adjustable on said carrier according to said carriage scale, at any position of adjustment of said carrier.

11. In a combined typewriting and computing machine, the combination with a traveling carriage comprising a platen, and a rail on which said carriage travels near the rear thereof, of a rail toward the front of the machine, a front plate extending downwardly in front of said front rail, bearings between said front plate and said front rail and forming the sole support for the front of said carriage, said front rail comprising two separately-mounted bearing surfaces, means for finely adjusting said bearing surfaces relatively to each other, and means for independently holding said bearing surfaces in any one of several adjusted positions.

12. In a combined typewriting and computing machine, the combination with a traveling carriage comprising a platen and a rail on which said carriage travels near the rear thereof, of a rail toward the front of the machine, a front plate extending downwardly in front of said front rail, bearings between said front plate and said front rail and forming the sole support for the front of said carriage, said front rail comprising two separately-mounted bearing surfaces, means for finely adjusting said bearing surfaces relatively to each other, means for independently holding said bearing surfaces in any one of several adjusted positions, brackets by which said front plate is connected to the typewriter carriage by which it supports said carriage, and means for finely adjusting said plate on said brackets.

13. In a combined typewriting and computing machine, in combination, a totalizer, a master wheel, a typewriter carriage comprising a totalizer-supporting plate through which said carriage is supported at its front, means, including a track, to guide said plate, said track comprising two rails, and means effective on said rails at different points therealong, whereby said rails may be adjusted by flexing to insure accurate guiding of said totalizer in passing through a computing zone.

14. In a combined typewriting and computing machine, the combination with a traveling carriage and a rail on which it travels, of a second rail, a totalizer mounted near said second rail but outside of both rails, a master wheel also outside of said rails, two facing V-grooves formed in said second rail, a plate having V-grooves facing said second rail and forming a mounting for the totalizer, means for adjusting the rail grooves relatively to each other, means for separately holding said rail grooves independently at any one of several adjusted positions, said means for adjusting the rail grooves including a separate plate for each rail groove, a plurality of screws for drawing said plates together, and a plurality of screws for forcing said plates apart, said screws forming a plurality of groups, each comprising a separating screw and a drawing-together screw.

15. In a combined typewriting and com puting machine, the combination with a traveling carriage and a rail on which it travels, of a second rail, a totalizer mounted near said second rail but outside of both rails, a master wheel also outside of said rails, two facing V-grooves formed in said second rail, a plate having V-grooves facing said second rail and forming a mounting for the totalizer, means for adjusting the rail grooves relatively to each other, means for separately holding said rail grooves independently at any one of several adjusted positions, said means for adjusting the rail grooves including a separate plate for each rail groove, a plurality of screws for drawing said plates together, and a plurality of screws for forcing said plates apart, each comprising at least a separating screw and a drawing-together screw, the screws in each group being so distributed that they effect a symmetrical straining of the portions.

FREDERICK A. HART.

Witnesses:
 EDITH B. LIBBEY,
 JENNIE P. THORNE.